G. W. MILLER.
REIN-HOLDER.

No. 170,759. Patented Dec. 7, 1875.

WITNESSES:
E. Wolff
A. F. Terry

INVENTOR:
G. W. Miller
BY
Munn & Co.
ATTORNEYS.

UNITED STATES PATENT OFFICE.

GEORGE W. MILLER, OF CONSTITUTION, PENNSYLVANIA.

IMPROVEMENT IN REIN-HOLDERS.

Specification forming part of Letters Patent No. 170,759, dated December 7, 1875; application filed September 25, 1875.

*To all whom it may concern:*

Figure 1:
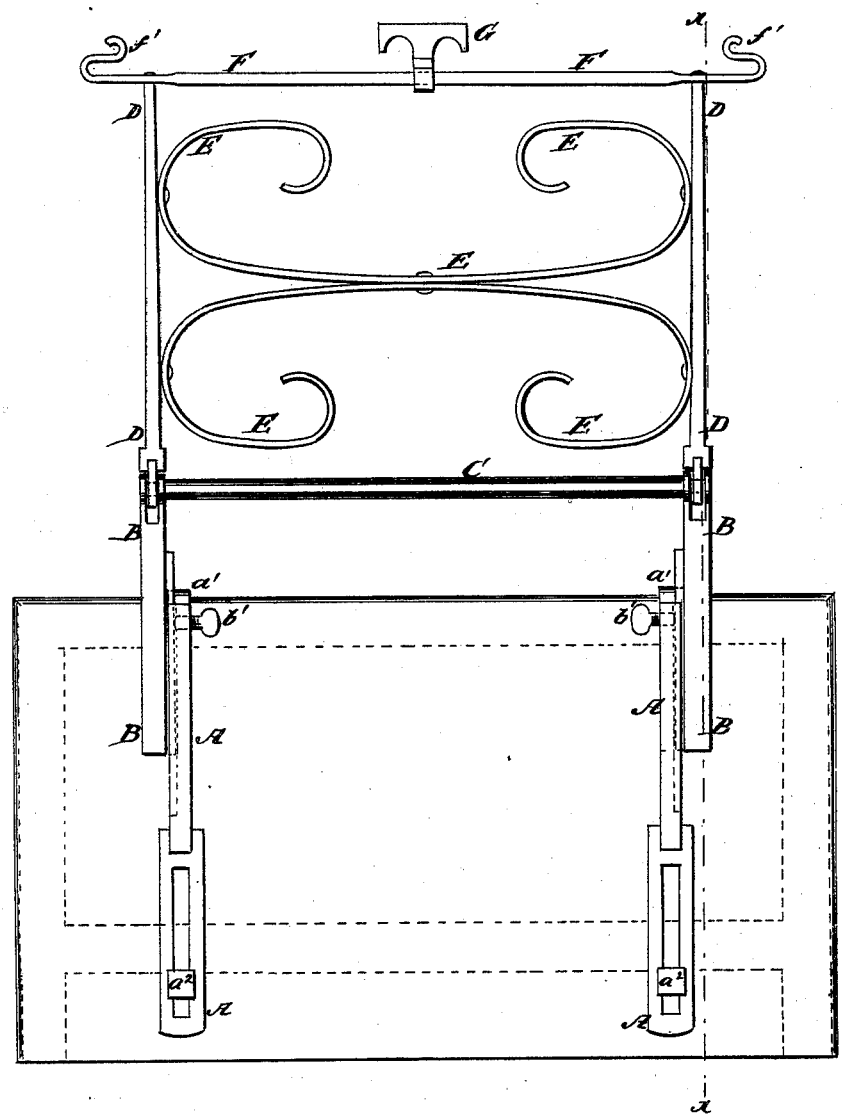
Figure 2:
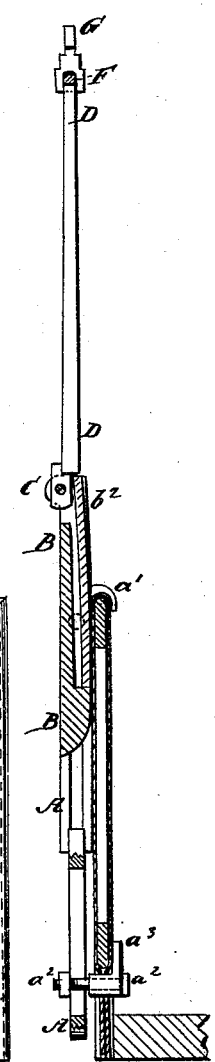

Be it known that I, GEORGE W. MILLER, of Constitution, in the county of York and State of Pennsylvania, have invented a new and useful Improvement in Adjustable Rein-Rest, of which the following is a specification:

Figure 1 is a front view of my improved rein-rest, shown as attached to a dash-board. Fig. 2 is a vertical cross-section of the same, taken through the line $x\,x$, Fig. 1.

Similar letters of reference indicate corresponding parts.

The object of this invention is to furnish an improved rein-rest for attachment to the dash-board of vehicles, which shall be so constructed as to prevent the horse from throwing his tail over the reins, and to prevent the reins from falling to the ground should they be accidentally dropped, which may be turned down out of the way when not required for use, and which shall be simple in construction, convenient in use, and neat and ornamental in appearance.

The invention consists in the combination of the springs with the hinged side bars of a rein-rest; in the combination of the slotted and grooved bars with the hinged bars of a rein-rest; in the combination of the slotted and grooved bars, the tongued bars, the cross-rod, the hinged side bars, the springs, the brace, the top cross-bar, and the T or double hook, with each other, as hereinafter fully described.

A are two bars, which have hooks $a^1$ formed upon their upper ends, to hook over the top bar or upper edge of the dash-board. The lower part of the bars A are slotted longitudinally, to receive the bolts $a^2$ that pass through the lower part of the dash-board, or beneath the lower cross-bar of the dash-board frame. The bolts $a^2$ may be passed through a hook or flanged socket, $a^3$, to give them a firmer hold upon the dash-board. In the outer sides of the upper parts of the bars A are formed grooves to receive tongues formed upon the inner sides of the bars B, so that the said bars B may be moved up and down to adjust them as required. The bars B are secured in place when adjusted by set-screws $b^1$. The upper ends of the bars B are connected, and held in their proper relative position, by a cross or brace rod, $c$, the ends of which serve as pivots to the lower ends of the bars D. The bars D are held in position, both when raised and when lowered by the springs $b^2$, which are secured in grooves or slots in the bars B, and which operate in the same manner as the springs of a pocket-knife. The bars D are connected and strengthened by an ornamental brace, E, and their upper ends are connected by a cross-bar, F, upon which the reins rest. The ends of the cross-bar F are curved upward, inward, upward and outward, or have hooks or goose-necks $f'$ formed upon them, both for the sake of ornament and to prevent the reins from slipping off the said ends. To the cross-bar F is attached the foot of the T or double hook G, which is designed to pass between the reins as they rest upon the bar F, both to keep them apart and to prevent them from drawing out of the vehicle, should they happen to escape from the hands of the driver, or be dropped or laid down. The T or double hook G may be attached to the center of the cross-bar F, or toward one end, according to the position in which the driver is to sit, or it may be movable, so as to be adjusted as required. When not required for use, the upper or hinged part of the device may be turned down upon the forward side of the dash-board, so as to be entirely out of the way.

Having thus described my invention, I claim as new and desire to secure by Letters Patent—

1. The combination of the springs $b^2$, with the hinged side bars B D of a rein-rest, substantially as herein shown and described.

2. The combination of the slotted and grooved bars A, with the hinged bars B D of a rein-rest, substantially as herein shown and described.

3. The combination of the slotted and grooved bars A, the tongued bars B, the cross-rod $c$, the hinged bars D, the springs $b^2$, the brace E, the cross-bar F, and the T or double hook G, with each other, substantially as herein shown and described.

GEORGE W. MILLER.

Witnesses:
JOHN A. HAWKINS,
HENRY S. MERRYMAN.